(12) United States Patent
Ishikawa et al.

(10) Patent No.: US 6,549,641 B2
(45) Date of Patent: Apr. 15, 2003

(54) SCREEN IMAGE OBSERVING DEVICE AND METHOD

(75) Inventors: Takatoshi Ishikawa, Osaka (JP); Yasushi Kobayashi, Moriguchi (JP); Kenji Ishibashi, Izumi (JP); Hideki Nagata, Sakai (JP)

(73) Assignee: Minolta Co., Inc., Osaka (JP)

( * ) Notice: Subject to any disclaimer, the term of this patent is extended or adjusted under 35 U.S.C. 154(b) by 0 days.

(21) Appl. No.: 09/179,770

(22) Filed: Oct. 27, 1998

(65) Prior Publication Data

US 2002/0001397 A1 Jan. 3, 2002

(30) Foreign Application Priority Data

Oct. 30, 1997 (JP) .............................. 9-298048

(51) Int. Cl.$^7$ ................................................. G06K 9/00
(52) U.S. Cl. ...................................... 382/103; 382/107
(58) Field of Search ................................. 382/103, 107; 345/8, 7; 353/98; 348/59, 169, 170, 171, 172

(56) References Cited

U.S. PATENT DOCUMENTS

| | | | | |
|---|---|---|---|---|
| 3,860,821 A | * | 1/1975 | Barrett | 250/263 |
| 4,303,394 A | * | 12/1981 | Berke et al. | 434/40 |
| 4,845,634 A | * | 7/1989 | Vitek et al. | 700/97 |
| 4,987,487 A | * | 1/1991 | Ichinose et al. | 348/59 |
| 5,138,555 A | | 8/1992 | Albrecht | 364/424.06 |
| 5,243,413 A | * | 9/1993 | Gitlin et al. | 348/269 |
| 5,515,122 A | * | 5/1996 | Morishima et al. | 353/98 |
| 5,581,271 A | * | 12/1996 | Kraemer | 345/8 |
| 5,661,603 A | * | 8/1997 | Hanano et al. | 359/622 |
| 5,726,670 A | * | 3/1998 | Tabata et al. | 345/7 |
| 5,966,167 A | * | 10/1999 | Nose et al. | 348/59 |

FOREIGN PATENT DOCUMENTS

JP           8-205198           8/1996

* cited by examiner

Primary Examiner—Leo Boudreau
Assistant Examiner—Abolfazl Tabatabai
(74) Attorney, Agent, or Firm—Sidley Austin Brown & Wood LLP

(57) ABSTRACT

A screen image observing device and method provides the sensations of virtual reality to the observer and reduces, to the extent possible, the discrepancy that is perceived by the observer between the movement of the observer's head and the displayed screen image. The device has a head tracking means, which detects the movement of the observer's head, and a screen image generating means, which generates image data based upon the result of the detection performed by the head tracking means. Image data is supplied to a display means.

16 Claims, 6 Drawing Sheets

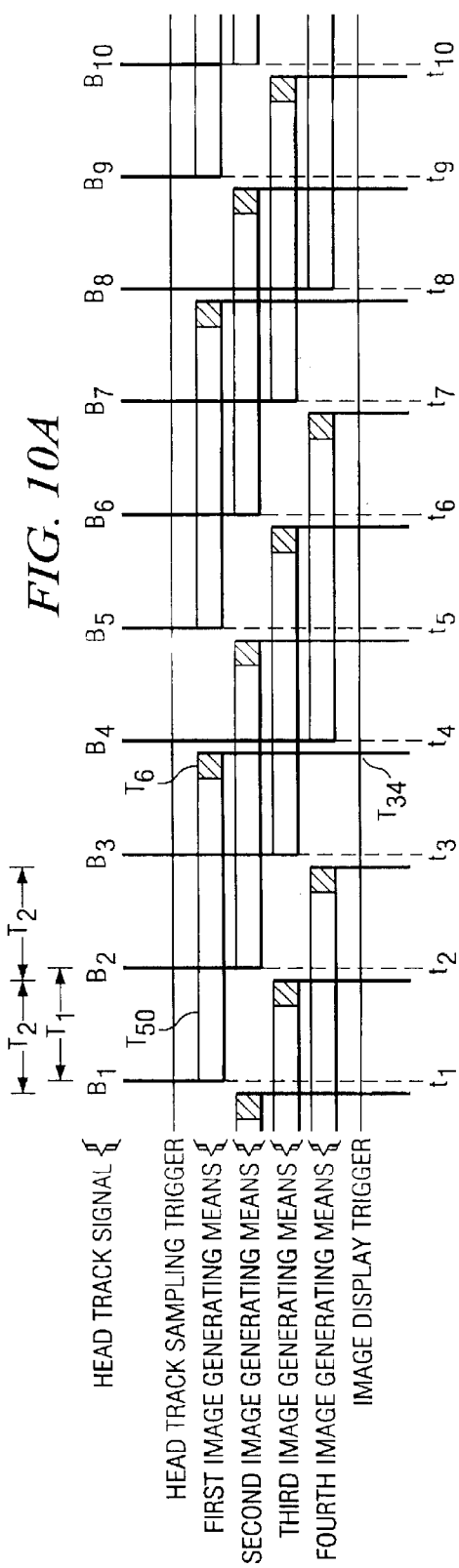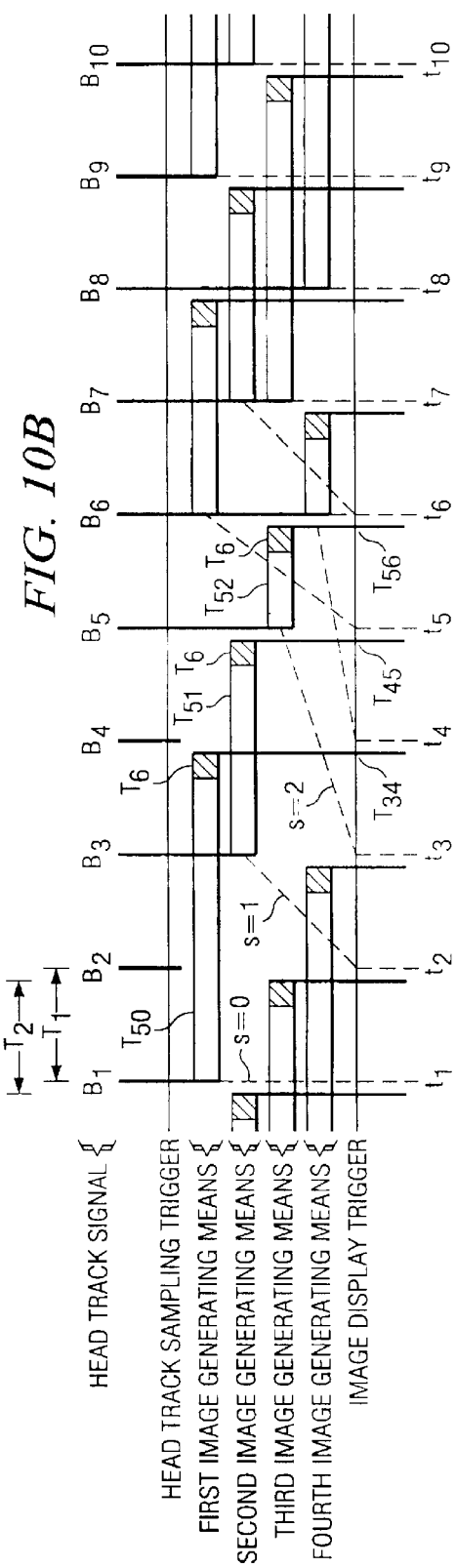

SCREEN IMAGE OBSERVING DEVICE AND METHOD

FIELD OF THE INVENTION

The present invention pertains to a screen image observing device having a head tracking function, and more particularly, to a screen image observing device such as a head mounted display (HMD) which provides the sensations of virtual reality to the observer.

BACKGROUND OF THE INVENTION

Screen image observing devices having a head tracking function are conventionally known as being those devices which display appropriate graphical computer screen images in response to movement of the observer's head. These devices also typically have a remote control system in which a camera is remotely controlled based on head tracking signals. Screen images, captured by the camera, are observed through an HMD. By utilizing a screen image observing device with a head tracking function in this way, it is possible to display screen images which have increasingly realistic appeal.

In conventional screen image observing devices, however, a discrepancy exists between the movement of the observer's head and the displayed screen image. A certain time interval is required for image processing after a head movement is detected but before a new image, based upon the result of the head movement, is displayed. When the observer's head is essentially stationary, the discrepancy cannot be perceived to any significant extent, even if movement of the head does not match the displayed screen image. However, when the observer's head moves quickly, the discrepancy can be perceived. Such a discrepancy between visual information and physically perceived acceleration causes mental discomfort and can cause the observer to become nauseous, due to his vestibular sense. The faster the observer's head moves, the larger the discrepancy in the displayed screen image, and the more severe the discomfort and nausea.

SUMMARY OF THE INVENTION

An object of the present invention is to provide a screen image observing device and method that reduces, to the extent possible, the discrepancy that is perceived by the observer between the movement of the observer's head and the displayed screen image.

In order to attain the object described above, a screen image observing device is provided having a head tracking means, which detects the movement of the observer's head, and a screen image generating means, which generates image data based upon the result of the detection performed by the head tracking means and supplies the image data to a display means. The screen image observing device also has a control means for controlling the screen image generating interval, used by the screen image generating means, in response to the detection performed by the head tracking means.

In this embodiment, the movement of the head is first detected by the head tracking means. The screen image generating means generates screen image data in accordance with the detection result obtained by the head tracking means, i.e., it generates screen image data to keep up with the head movement. The control means controls the screen image generating interval used by the screen image generating means. When the screen image generating interval is accelerated by the control means, the time period after a head tracking signal is detected but before a screen image based on the detection result is displayed, is reduced. Therefore, the discrepancy between the displayed screen image and the view in the direction in which the head faces is reduced accordingly.

Head movement encompasses all movements of the head, including rotational movement, back and forth movement and side to side movement. It is therefore possible to calculate the direction in which the head faces in these dimensions, in accordance with the detection result obtained by the head tracking means. In this case, the screen image generating means executes a process to generate, from the original data, screen image data having parallax information that corresponds to the right and left eyes, respectively. The control means will control the screen image generating interval for this screen image data.

In another aspect of the present invention, a screen image observing device which has an image capture means, and the screen image generating means generates the screen image data using the captured image data from the image capture means.

In this embodiment, an image of an object in the direction corresponding to the detection result, obtained by the head tracking means, is captured by the image capture means. The screen image generating means generates screen image data using this captured image data. The control means controls the screen image generating interval used by the screen image generating means.

In a further aspect of the present invention, the control means reduces the screen image generating interval, used by the screen image generating means, to below a prescribed time period according to the formula;

$$V\theta = \frac{2 \times Y}{X},$$

wherein:
  $V\theta$ is the angular speed, in degrees per second, of the rotational movement of the head which is calculated from the result of the detection performed by the head tracking means;
  X is the number of pixels in the image, displayed by the display means, corresponding to a one-degree angle of view on the retina; and
  is the frame rate in frames per second.

A larger angular speed of the rotational movement of the head results in a larger perceived discrepancy between the view in the direction in which the head faces and the displayed screen image. Therefore, in this embodiment, the control means determines whether or not to reduce the screen image generating interval, used by the screen image generating means, in accordance with the angular speed of the rotational movement of the head. Using this control means, where the head moves only slightly and the observer cannot perceive the discrepancy, the control means does not shorten the screen image generating interval. On the other hand, where the angular speed of the rotational movement of the head equals or exceeds a certain level, the observer can perceive the discrepancy, and, therefore, the screen image generating interval is reduced so that the discrepancy between the displayed screen image and the view in the direction in which the head faces may be reduced. The constant value 2×Y/X indicates the angular speed of the head at which the displayed screen image deviates from the image actually observed by two pixels during one frame display period.

In yet a further aspect of the present invention control means determines whether or not to obtain a second head tracking signal in response to a first head tracking signal received from the head tracking means, and where it is determined that a second head tracking signal is to be obtained, reduces the screen image generating interval, used by the screen image generating means, to below a prescribed time period.

The control means normally detects a first head tracking signal and performs the ensuing control based on this signal, and a screen image is displayed at a prescribed display time. Here, if the amount by which the screen image generating interval should be reduced is estimated in accordance with the first head tracking signal, and a second head tracking signal, generated after a smaller time lag than used for the first head tracking signal, is detected, subsequent control is performed based on this second head tracking signal. A screen image is displayed at a prescribed display time and control is performed based on subsequent head tracking information, resulting in a reduced discrepancy between the displayed screen image and the view in the direction in which the head faces. Such control is increasingly effective as the head moves faster.

In a further aspect of the present invention, the control means controls the screen image generating interval by controlling the number of colors per pixel in the screen image data.

In this embodiment, the data amount is reduced by reducing the number of colors per pixel in the screen image data, for example, and the screen image generating interval may be reduced to that extent. Since the motion tracking capacity of the human eyeball is said to be 35 degrees per second, when the speed of the head movement exceeds a certain level, focusing is not fixed or functioning (i.e., even though the observer sees an object, he is not fully perceiving its colors or edges). Therefore, even if the number of colors is reduced, the observer does not feel discomfort.

In another aspect of the present invention, the control means controls the screen image generating interval by controlling the number of pixels for one item of screen image data.

In this embodiment, a screen image for one frame may be expressed using less screen image data by increasing the number of pixels corresponding to one item of screen image data, for example. When the screen image data for one frame is reproduced from the original data stored in memory, the reproduction time is reduced by thinning the pixel data. In addition, because the data amount is reduced, the transmission interval also is reduced when the data is transmitted. In other words, the screen image generating interval is reduced. Therefore, as with the previous aspect where the angular speed of the rotational movement of the head exceeds a certain level, the observer can observe the image without feeling discomfort.

In yet another aspect of the invention, the control means controls the processing means in response to the result of the detection performed by the head tracking means, and the processing means transmits the captured image data to the screen image generating means after controlling the data amount based on the signals received from the control means.

In this embodiment, data captured by means of the image capture means is transmitted to the screen image generating means after being controlled in terms of its data amount. Therefore, the amount of data transmitted from the image capture device to the screen image generating means may be reduced. Where the data amount to transmit is small, the time interval required to complete the transmission of the data is reduced. In addition, by reducing the amount of data transmitted from the image capture device to the screen image generating means, wireless transmission becomes possible, allowing the device to become a screen image observing device having a remotely controllable image capture device.

BRIEF DESCRIPTION OF THE DRAWINGS

FIG. 10A shows another example of a control timing chart for a screen image observing device that does not undergo screen image generating interval reduction control.

FIG. 10B shows another example of a timing chart for a screen image observing device that undergoes screen image generating interval reduction control.

DETAILED DESCRIPTION OF THE INVENTION

Figure 1:
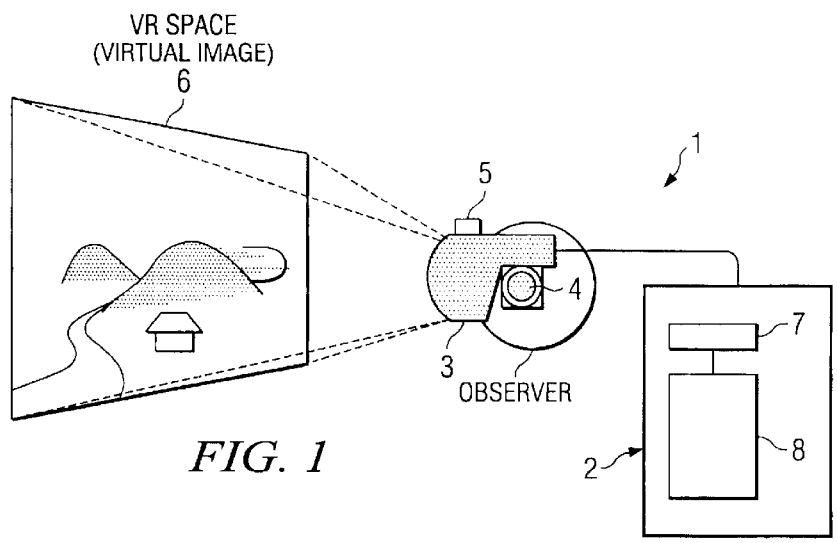
FIG. 1 is a diagram showing the overall construction of a screen image observing device of a first embodiment.

FIG. 1 is a diagram showing the overall construction of an HMD pertaining to a first embodiment of the present invention. This device comprises a screen image display unit 1 and a work station (processing means) 2. The screen image display unit 1 comprises a display means 3 that displays screen images, a sound providing means 4 that provides sounds and a head tracking means 5 that detects the angular acceleration of the rotational movement of the head.

When the screen image display unit 1 is mounted on the head, the display means 3 is positioned in front of the eyes and the sound providing means 4 is positioned close to the ears. FIG. 1 also shows an example of a screen image 6, which is observed by the observer. The work station 2 has a control means 7 and a screen image generating means 8.

Figure 2:
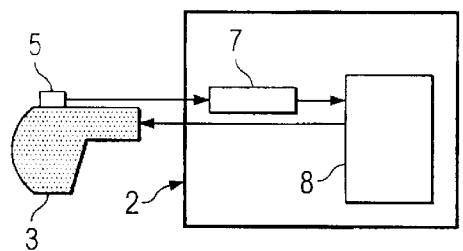
FIG. 2 is a summary block diagram of the screen image observing device of the first embodiment.

FIG. 2 shows a summary block diagram of this device. A head tracking signal detected by the head tracking means 5 is sent to the control means 7. The control means 7 calculates the angular speed of the rotational movement of the head based on the head tracking signal. It also calculates the direction in which the head is facing (i.e., head orientation) from the angular speed and generates control signals. It then outputs the control signals, which include head orientation data, to the screen image generating means 8.

The screen image generating means 8 performs screen image generation based on the control signals. For the original data for the screen images, data such as computer graphics, for example, is used. Alternatively, image data gathered from around the head and accumulated in the memory may be used. The screen image generating means 8 reads an image for the display angle of view from the original data based on the control signals. It then converts the image data into screen image data and sends it to the display means 3. The screen image data is displayed by means of the display means 3. The series of processes that starts when control signals are received and ends when screen image data is generated is hereinafter referred to as the "screen image generating process".

In this embodiment of the screen image observing device, the screen image generating interval is reduced in accordance with a classification based on prescribed speed classification conditions regarding the rotational movement of the observer's head (processing interval reduction control). The prescribed speed classification conditions are explained below.

The control means 7 first calculates the angular speed $V\theta_h$, in degrees per second, for the horizontal component and the angular speed $V\theta_v$, in degrees per second, for the vertical component of the rotational movement of the head based on the head tracking signal detected. It then calculates the synthesized angular speed $V\theta$ from these speeds. $V\theta$ is calculated according to the formula $V\theta=(V\theta_h^2+V\theta_v^2)^{1/2}$. Using this $V\theta$, the angular speed of the head rotation is classified as set forth below.

(A) Stationary: $V\theta<2\times Y/X$
(B) Low speed: $2\times Y/X \leq V\theta \leq 15$
(C) Medium speed: $15 \leq V\theta \leq 30$
(D) High speed: $V\theta>30$ In the classification conditions set forth above, X represents the number of pixels in the display screen image corresponding to a one-degree angle of view on the retina, and Y represents the frame rate in frames per second.

When a stationary object is observed in one frame with a one-pixel discrepancy in the display screen image, $V\theta$ is equal to Y/X. During such an ultra-low speed condition, the eyes are keeping up with the screen image and are presumably attentively looking at the object on the screen. They can therefore observe colors and shapes in detail. For example, where the LCD elements for the 300,000 pixels in a 640-pixel by 480-pixel VGA display (900,000 pixels in an RGB display) are the display elements and the angle of view of the observer is 40°, X is 16 pixels per degree. If the frame rate (Y) is 60 frames per second, Y/x becomes 3.75. In other words, when $V\theta=3.75$ degrees per second, an object in one frame is observed with a one-pixel discrepancy.

It is said that the low-speed and smooth movement of the eyes that occurs when they slowly follow a moving object takes place at 35°/sec or less. The speed classification conditions set forth above were adopted in consideration of this principle.

The processing interval reduction control based on the speed classification conditions will now be explained. In this device, the number of colors in the image data is determined in response to the detected speed information (classification). Where the speed classification is (D), or high-speed, the number of colors is the smallest (many bits are dropped), while in the stationary condition, or classification (A), the regular eight-bit data is used without dropping any bits. When the number of colors is reduced by dropping bits, the processing interval used by the same screen image generating means 8 may be reduced.

The reduction in the number of colors will be explained in detail with reference to FIG. 3. Specifically, the reduction in the number of colors is obtained by reducing the number of bits for one pixel of the image data. Computer graphics screen images and screen images captured by the camera are stored in the screen image generating means 8 in compressed form. These items of image data are eight-bit data in this embodiment.

The screen image generating means 8 reproduces necessary data from the data stored in it in accordance with the instructions from control signals, including a reduce color signal, sent from the control means 7. FIG. 3 shows image data reproduced based on a reduce color signal. Since image data can only be sent to the display means 3 as eight-bit data, it is necessary to supplement the "as reproduced" image data before it is sent as shown in FIG. 3.

When the angular speed of the rotational movement of the head is in the stationary category, the control means 7 sends to the screen image generating means 8 a reduce color signal instructing reproduction of the eight-bit image data as is. It is not necessary to supplement the reproduced image data.

The control means 7 similarly generates and sends to the screen image generating means 8 a reduce color signal that instructs reproduction after eliminating the lower two digits, four digits and six digits of the eight-bit image data when the angular speed of the rotational movement of the head is in the low-speed, medium speed and high-speed categories, respectively. When they are sent to the display means 3, they are converted into screen image data supplemented by one or more zeros in the eliminated bit data locations.

Since zero is allocated in the eliminated bit data locations at all times, the number of gradations (colors) expressed by the image data decreases as the speed increases, but since the number of bits reproduced decreases to that extent, the time interval needed to reproduce the image data is reduced.

The processing interval is reduced in this embodiment by reducing the number of colors in the manner described above. The method of reducing the screen image generating interval is not limited to this method, however. For example, an instruction may be given during the image reproducing stage such that the data for all pixels is not read but data reading takes place while skipping [n] number of pixels. Here, image reproduction takes place in which the data for the pixels that were not read is regarded as identical to the adjacent pixel data. In other words, the resolution is reduced. Through this control, the reading interval may be reduced, which in turn shortens the screen image generating interval.

The screen image generating interval is reduced as the speed increases through the screen image interval reduction control in this embodiment, and the delay in the display is increasingly eliminated as the speed increases. Since the delay in the display is more easily perceived by the observer as the speed increases, it is preferred that control be performed using the speed classification conditions described above. The clarity of the screen image drops because the number of colors in the displayed screen image decreases to the extent that the delay in the display is eliminated, but the eyes of the observer cannot follow the screen image to the extent that they can perceive the drop in image clarity, due to the rotational movement of the head. Therefore, the drop in clarity of the display screen image while the head is undergoing rotational movement is not considered a problem.

Figure 4:
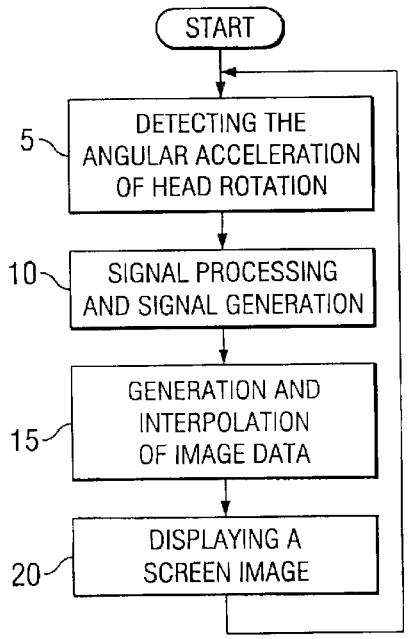
FIG. 4 is a flow chart showing the control process for each means in the screen image observing device of the first embodiment.

FIG. 4 is a simplified flow chart showing the control process in this device and indicating the function performed by each means. In step #5, the head tracking means 5 detects the angular acceleration of the head rotation (head tracking signal). It then sends this detection result to the control means 7. The control means 7 processes the signal thus received and generates signals based on the result of the processing in step #10.

In step #15, the screen image generating means 8 reproduces and supplements the image data based on the head orientation information signal and reduce color signal sent from the control means 7. The image data generated is converted into screen image data and then sent to the display means 3. The display means 3 displays a screen image in step #20.

Figure 5:
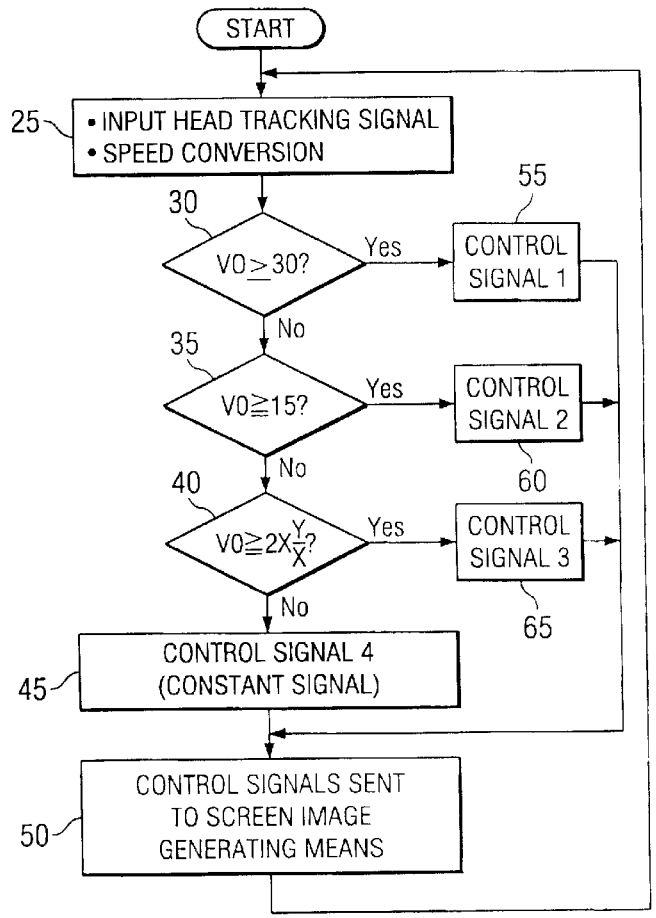
FIG. 5 is a flow chart showing the control process performed by the control means of the first embodiment.

FIG. 5 is a flow chart of the control process regarding the generation of a reduce color signal by the control means 7. A head tracking signal is first input in step #25. Based on this signal, the angular speed Vθ of the rotational movement of the head is calculated. It is determined in step #30 whether or not Vθ equals or exceeds 30 (Vθ=30). If it does, the process advances to step #55, where a control signal 1 which instructs reproduction of the image data after elimination of the lower six digits of bit data, is generated in step #55.

If Vθ is smaller than 30, the process advances to step #35, where it is determined whether or not Vθ equals or exceeds 15 (Vθ=15). If it does, the process advances to step #60, where a control signal 2, which instructs reproduction of the image data after elimination of the lower four digits of bit data is generated.

If Vθ is smaller than 30, the process advances to step #40, where it is determined whether or not Vθ equals or exceeds 2×Y/X (Vθ=2×Y/X). If it does, the process advances to step #65, where a control signal 3, which instructs reproduction of the image data after elimination of the lower two digits of bit data, is generated.

If Vθ does not equal or exceed 2×Y/X (Vθ=2×Y/X), a control signal 4, which instructs reproduction of the eight-bit image data, is generated in step #45. The control signals generated in these steps are sent to the screen image generating means 8 in step #50. The screen image generating means 8 reproduces the image based on the control signal as well as a head orientation information signal that is also received.

Figure 6:
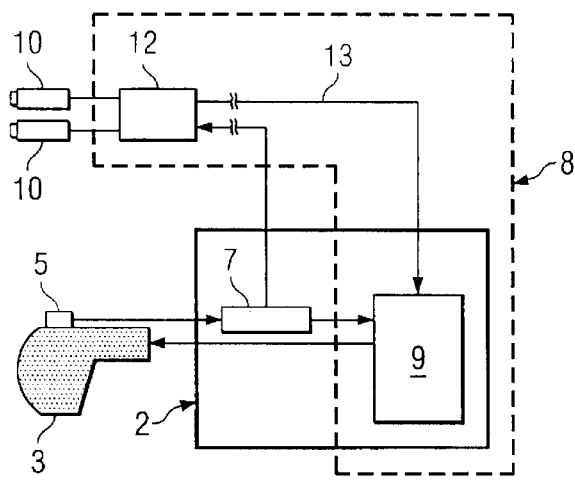
FIG. 6 is a summary block diagram of a screen image observing device of a second embodiment.

FIG. 6 is a summary block diagram of a screen image observing device pertaining to a second embodiment. In this embodiment, data captured by an image capture means is used as the original data for the screen image data. An image capture means 10 comprises two cameras that are aligned side by side. A processing means 12 controls the image capture means 10 and processes the captured image data in accordance with the instructions from the control means 7.

The control means 7 calculates the head orientation based on the head tracking signal, detected by the head tracking means 5, and sends control signals, including a reduce color signal, to the processing means 12. The image capture means 10, which is controlled by the processing means 12, is controlled such that it moves in linkage with the movement of the head, and captures the screen images of the view in the direction that the head is facing. A data transfer cable 13 connects the processing means 12 and the screen image reproducing means. Image data that has undergone processing, such as compression, by the processing means 12 is sent to the screen image reproducing means.

A screen image reproducing means 9 decompresses, reproduces, and supplements the image data received. The image data decompressed and reproduced by the screen image reproducing means 9 is converted into screen image data, and is then sent to the display means 3, where it is displayed. In this embodiment, the processing means 12 and the screen image reproducing means 9 are together termed a screen image generating means 8.

Figure 7:
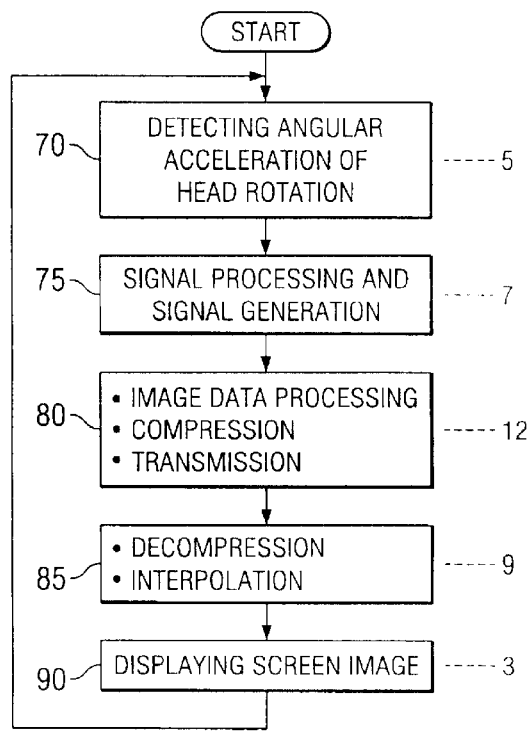
FIG. 7 is a flow chart showing the control process for each means of the screen image observing device of the second embodiment.

This device also undergoes processing interval reduction control in the screen image generating means 8 based on the prescribed speed classification conditions, in the same manner as in the device of the first embodiment. The reduce color signals that are generated here are the same as those in the first embodiment as well. However, since the method of screen image generation based on the reduce color signal is different due to the difference in the construction of the screen image generating means 8, this difference will be explained below with reference to the flow chart of FIG. 7.

The head tracking means 5 first detects the angular acceleration of the rotational movement of the head in step #70. The control means 7 calculates the angular speed of the rotational movement of the head, and then classifies it into the stationary, low-speed, medium speed, or high-speed category based on the prescribed speed classification conditions. It then generates a reduce color signal in accordance with the classification. In this embodiment, control signals, including this reduce color signal, are sent to the processing means 12. The processing means 12 converts the captured image data, stored in the memory, into image data with eliminated bits based on the reduce color signal and head orientation information in step #80. It then compresses the image data obtained after the conversion and transmits it using the data transfer cable 13. In other words, image data (as reproduced) having the number of bits shown in FIG. 3 is compressed and sent to the screen image reproducing means 9.

Figure 3:
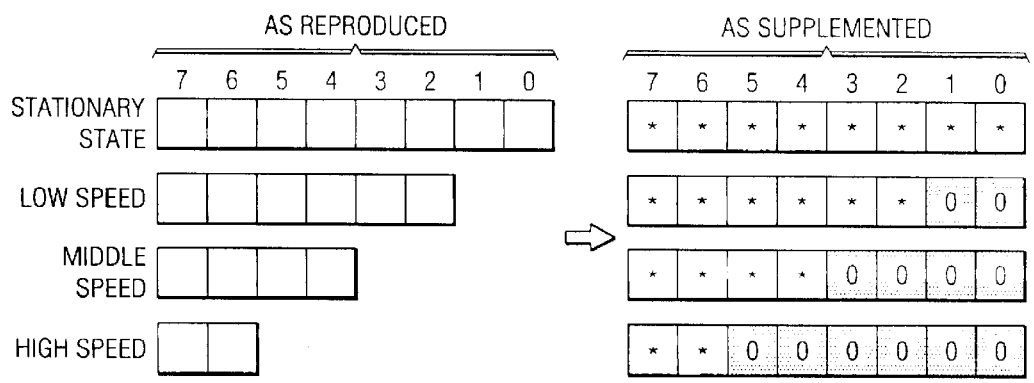
FIG. 3 is a diagram showing image data generated based on a reduce color signal and the same data supplemented by zeros in the eliminated data locations.

The screen image reproducing means 9 decompresses the image data received and then supplements it, also as shown in FIG. 3. It supplements the image data by allocating zero to the eliminated bit data locations. In this series of processes, fewer numbers of bits to be reproduced result in faster transmission by the data transfer cable 13, as well as faster decompression by the screen image reproducing means 9. In other words, the screen image generating interval used by the screen image generating means 8 becomes shorter. Therefore, the time lag in the display is eliminated in proportion to the increased speed, as in the first embodiment.

Figure 11:
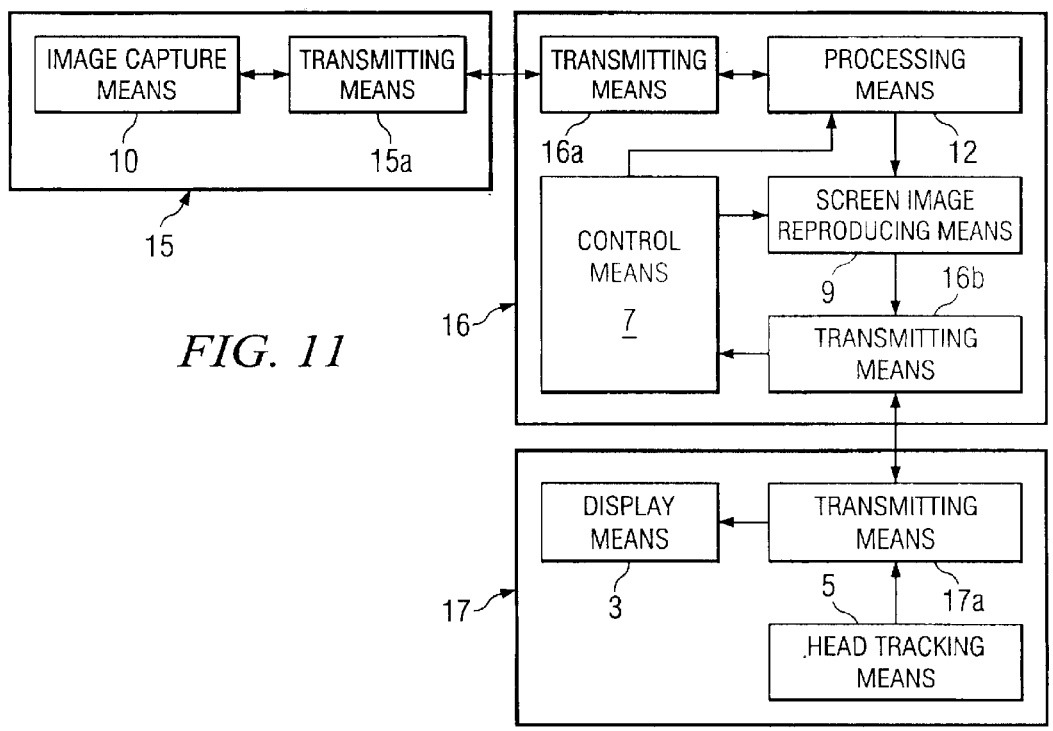
FIG. 11 is a block diagram showing each device comprising the screen image observing device of the second embodiment.

FIG. 11 is a block diagram of the screen image display device of this embodiment comprising an image capture device 15, a screen image generating device 16, and a display device 17, as also shown in FIG. 6. Communication is performed among these devices via their respective communication means.

The processes that are performed by the various means of the above devices were previously explained with reference to FIG. 6, and their explanations will therefore be omitted here. Since the image capture device 15 includes the processing means 12 which processes captured image data in the screen image generating device 16, its construction can be made simple. This makes the image capture device 15 easy to carry around.

FIG. 11 shows construction of each device included in this embodiment, but the constructions of these devices are not limited to these constructions. The constructions shown in FIG. 12 (the third embodiment) may be used instead, for example.

Figure 12:
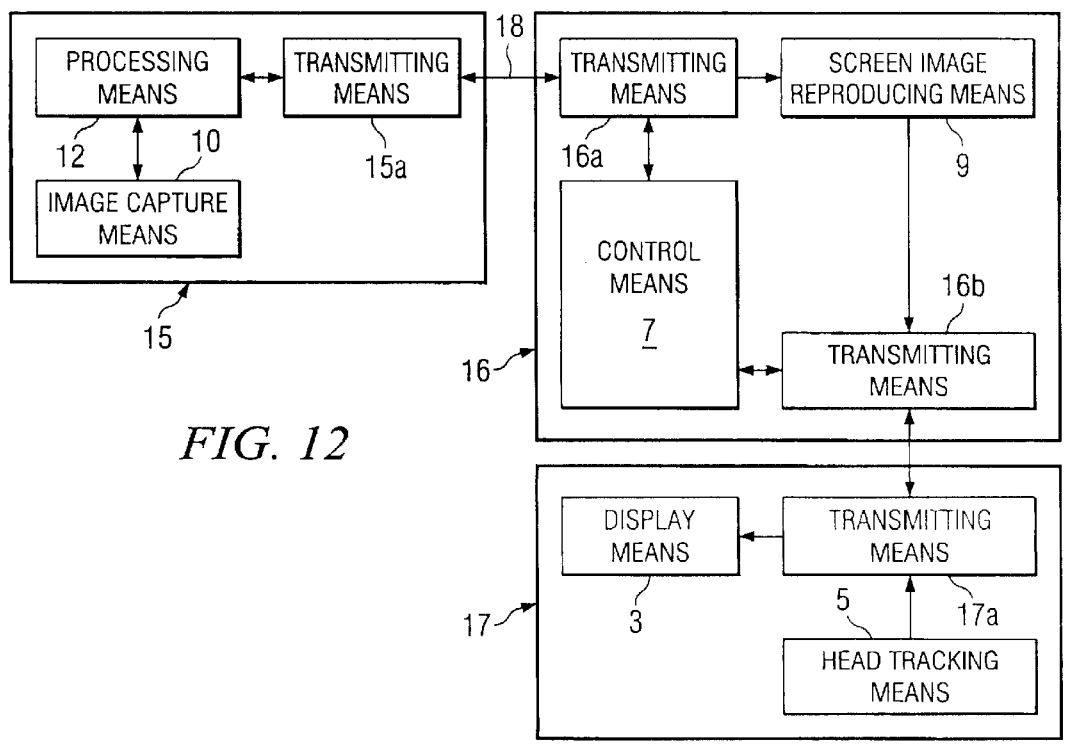
FIG. 12 is a block diagram showing each device comprising the screen image observing device of the third embodiment.

FIG. 12 is a block diagram of a screen image display device of this embodiment, showing each device separately. This embodiment differs from the second embodiment only in that the processing means 12, which processes the image data captured by the image capture means 10, is included in the image capture device 15, instead of in the screen image generating device 16. Specifically, the processing means 12, which converts the captured image data into image data with eliminated bits based on a reduce color signal sent from the control means 7, is included in the screen image generating device 16.

By using the construction of this embodiment, data is reduced in the image capture device 15 before it is sent to the screen image generating device 16. In other words, the amount of data transmitted through the data transfer cable 18 is smaller. Consequently, data may be transmitted wirelessly without using the data transfer cable 18. Where wireless data transfer is used, the image capture device 15 may be remotely controlled.

Figure 8:
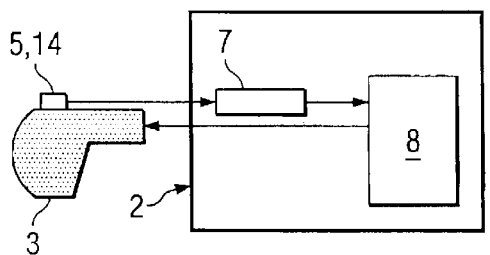
FIG. 8 is a summary block diagram of a screen image observing device of a fourth embodiment.

While the basic construction of the device of this embodiment is identical to the device of the first embodiment, it differs in that the head tracking means 5 works as a motion tracking means (position detecting means) as well. FIG. 8 is a summary block diagram of this embodiment. The motion tracking means 14 detects non-rotational movements of the observer's head, such as the back and forth movement, side to side movement and up/down movement. In other words, it can calculate a three-dimensional position of the observer's head from a motion tracking signal.

The control means 7 calculates the angular speed of the head's rotational movement from the head tracking signals and calculates the moving speed of the head from the motion tracking signals. It then classifies the angular speed and the moving speed based on prescribed speed classification conditions. It generates a reduce color signal in accordance with the classification and sends control signals, including head orientation information, head position information, and the reduce color signal, to the screen image generating means 8.

The screen image generating means 8 generates image data based on the signals received. At this time, the screen image generating means 8 re-generates image data for the right and left eyes, respectively, which includes parallax information, based on the original information stored in advance. Therefore, fewer bits of generated image data results in less generation time.

Other than the points that (i) the moving speed of the head is used in addition to the angular speed of the head's rotational movement and (ii) the screen image generating method used by the screen image generating means 8 is different, the same control process performed in the first embodiment is performed in this device, and therefore explanations for other operations are omitted.

In the first through fourth embodiments, control is performed in which the screen image generating interval is reduced in response to the speed classification conditions (the screen image transmission interval is also included in the third embodiment). It is preferred that control be performed so that screen image data is generated based on a head tracking signal which is detected at a time close to the time at which display takes place. This control process is explained below with reference to the timing charts of FIGS. 9A and 9B (first example), and FIGS. 10A and 10B (second example). Specifically, the control process shown in the timing charts of FIGS. 9A and 9B will first be explained with respect to a case where it is applied in the screen image observing device of the first embodiment.

Figure 9A:
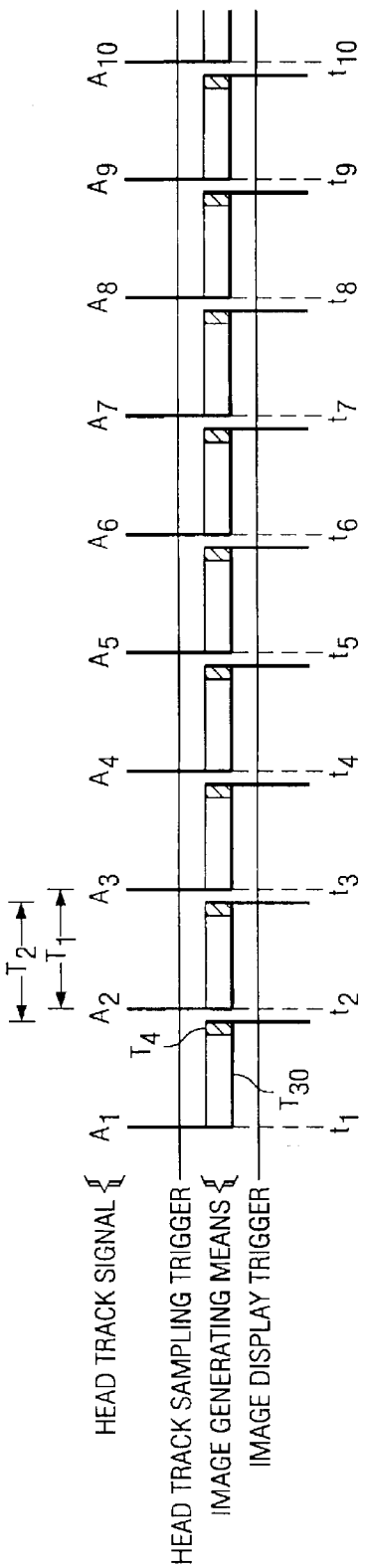
FIG. 9A shows an example of a timing chart for a screen image observing device that does not undergo screen image generating interval reduction control.

For comparison purposes, the control of a device that has the same construction as the device of the first embodiment but does not undergo screen image generating interval reduction control will be explained with reference to the timing chart of FIG. 9A. In the timing charts of FIGS. 9A and 9B, and FIGS. 10A and 10B described below, the head track sampling trigger, the screen image display trigger and the screen image generating process performed by the screen image generating means 8 are shown.

A head track sampling trigger is generated for every cycle $T_1$. The base times at which a head track sampling trigger is generated are shown as $t_1$, $t_2$, $t_3$, etc. A head tracking signal that includes head angular acceleration information, and that is generated by the head tracking means 5, synchronously with the head track sampling trigger, is indicated as $A_1$, $A_2$, $A_3$, etc.

A head tracking signal is sent to the control means 7. The control means 7 calculates head orientation, etc., from the head tracking signal and sends the information to the screen image generating means 8 as control signals. The screen image generating means 8 performs the screen image generating process based on these control signals.

The screen image generating interval is determined in accordance with the processing capability of the screen image generating means 8. In this embodiment, we will assume that the screen image generating interval is $T_{30}$. A certain interval is needed by the control means 7 between the time that a head track sampling trigger is generated and the time that the screen image generating means 8 begins the screen image generating process, but this time interval is omitted from the timing charts.

After a certain standby interval $T_4$ elapses following the completion of the screen image generating process, a screen image is displayed on the display means 3 in synchronization with a screen image display trigger, which is generated for every cycle $T_2$.

The control method used in the device of the first embodiment, in which the processing interval reduction control is employed, will now be explained with reference to the timing chart of FIG. 9B. A head track sampling trigger and a screen image display trigger are generated using the same cycles ($T_1$ and $T_2$) as in FIG. 9A.

The control means 7 detects a head tracking signal (a first head tracking signal) $A_1$, $A_2$, $A_3$, etc., generated at a base time. It then calculates the angular speed of the rotational movement of the head from this head tracking signal. It classifies the calculated angular speed of the rotational movement of the head into the stationary, low-speed, medium speed or high-speed category based on the prescribed speed classification conditions. It is then determined whether to detect a head tracking signal generated at a non-base time (a second head tracking signal) based on the classification. Where it is determined to detect a second head tracking signal, the amount of delay after the base time that should exist before the second head tracking signal (i.e., the amount of time lag to be set) is determined. Where a second head tracking signal is not to be detected, the time lag will be zero (s=0).

Where the angular speed was classified into any of the categories but the stationary category in the classification process, the control means 7 detects a second head tracking signal. The amount of time lag for the second head tracking signal detection is 1 for the low-speed category (s=1), 2 for the medium speed category (s=2) and 3 for the high-speed category (s=3). The larger the amount of time lag, the more delay from the base time.

A specific example shown in FIG. 9B will now be explained. The control means 7 detects a head tracking signal A3 at a base time $t_3$. It is assumed that the speed of the rotational movement of the head, which is calculated from this head tracking signal A3, is classified in the low-speed category as a result of the calculation. In this case, a head track sampling trigger is generated with the amount of time lag being 1, and a head tracking signal A3' which is generated at this time, is detected. In order to distinguish head track sampling triggers generated at base times and head track sampling triggers generated at non-base times, they are indicated by means of black bold lines and outlined white bold lines, respectively, in FIG. 9B.

The control means 7 performs signal processing, etc., based on the head tracking signal A3' and generates control signals. A reduce color signal is generated based on the amount of time lag. Based on these control signals, the screen image generating means 8 generates a screen image. The screen image generating interval becomes $T_{31}$, which is shorter than $T_{30}$ by the amount of time lag. The reduction of the screen image generating interval is achieved through the screen image generating interval reduction control (reduction in the number of colors) described above. The screen image data, thus generated, is sent to the display means 3. When a standby period $T_4$ has elapsed, screen image display takes place in synchronization with the output of a screen image display trigger.

Another specific example will now be shown. A head tracking signal A4 is detected at a base time $t_4$. It is assumed that the speed of the rotational movement of the head calculated from this head tracking signal A4, is classified in the medium speed category as a result of the calculation. In this case, a head track sampling trigger is generated with the amount of time lag being 2, and a head tracking signal A4', generated at this time, is detected. Signal processing is performed based on the head tracking signal A4' and control signals are generated. The screen image generating means 8 generates a screen image based on the control signals. The screen image generating interval becomes $T_{32}$, which is shorter than $T_{30}$ by the amount of time lag.

The generated screen image data is output to the display means 3 and is displayed after a standby period $T_4$ has elapsed, in synchronization with a screen image display trigger.

While the screen image generating interval is $T_{30}$ when the amount of time lag is zero, where the amount of time lag is 1, 2 and 3, screen image generation takes place in intervals $T_{31}$, $T_{32}$ and $T_{33}$, respectively, which are all shorter than $T_{30}$ as a result of the screen image generating interval reduction control. In FIG. 9A, the faster the speed of the rotational movement of the head, the larger the discrepancy between the head position at a base time and the head position at a time at which a screen image display trigger is generated. In other words, the discrepancy between the displayed screen image and the head position increases.

Figure 9B:
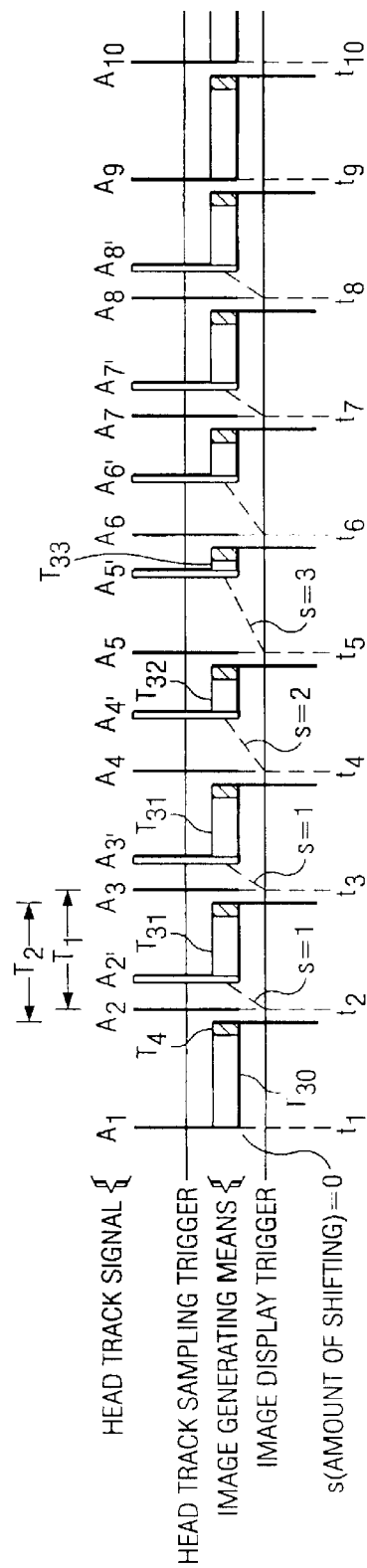
FIG. 9B shows an example of a control timing chart for a screen image observing device that undergoes screen image generating interval reduction control.

On the other hand, in FIG. 9B, because the delay between the generation of a screen image display trigger and the detection of a head tracking signal becomes shorter as the angular speed of the head rotation increases, the discrepancy can be reduced.

In the explanation given above, the function to prevent a displayed screen image discrepancy in a screen image observing device having one processing means (a means including the control means 7 and the screen image generating means 8) was explained, but this function may be applied in a screen image observing device having two or more processing means. Further, in the explanation given above, the case in which the angular speed of the rotational movement of the head was classified into one of four categories was shown, but such classification is not limited to this method. A timing chart regarding a screen image observing device having four processing means is explained below. In this example, the speed is classified into one of three categories, i.e., stationary, low-speed or high-speed.

As with FIGS. 9A and 9B, the control method for a device that has the identical construction, but which does not undergo screen image generating interval reduction control, will first be explained with reference to the timing chart of FIG. 10A for comparison purposes.

A head track sampling trigger is generated for every cycle $T_1$. The base times at which a head track sampling trigger is generated are indicated as $t_1$, $t_2$, $t_3$, etc. A head tracking signal that is generated by the head tracking means 5, synchronously with a head track sampling trigger, is indicated as $B_1$, $B_2$, $B_3$, etc.

In this device, the screen image generating interval used by the screen image generating means is $T_{50}$ and the standby period is $T_6$. A screen image display trigger is generated for every cycle $T_2$. Since the screen image generating interval $T_{50}$ is longer than the time required for two screen image display trigger cycles ($2T_2$), the images generated by means of the four screen image generating means are sequentially displayed synchronously with screen image display triggers.

The specific example shown in FIG. 10A will be explained with a focus on the first processing means, which comprises a first control means and a first screen image generating means. The first control means detects a head tracking signal $B_1$ generated at a base time $t_1$. It then generates control signals based on the head tracking signal $B_1$. These control signals are sent to the first screen image generating means. The first screen image generating means generates screen image data based on the control signals. Here, the screen image generating interval is $T_{50}$. After a standby period $T_6$ has elapsed, the generated screen image is displayed by the display means, in synchronization with a screen image display trigger, generated at a time $t_{34}$. This process is performed by each control means with a time lag of $T_1$.

The control method of the device that undergoes screen image generating interval reduction control will be explained with reference to the timing chart of FIG. 10B. A head track sampling trigger and a screen image display trigger are generated every cycle $T_1$ and $T_2$, respectively, in the same manner as in FIG. 10(a). The first through fourth control means sequentially detect head tracking signals, generated at base times, in the same manner as well. In other words, each control means sequentially detects a head tracking signal (the first control means detects a head track sampling signal $B_1$, the second control means detects a head tracking signal $B_2$, etc.). The screen image generating interval and standby period when the amount of time lag is zero are $T_{50}$ and $T_6$, respectively, the same as with the device of FIG. 10A.

In FIG. 10B, based on the head tracking signal detected at a base time (first head tracking signal), each control means first calculates the angular speed of the rotational movement of the head at that time. The angular speed is then classified into the stationary, low-speed or high-speed category based on prescribed speed classification conditions. The amount of time lag for the detection of a second head tracking signal is then determined.

If the speed is classified in the stationary category, the amount of time lag is zero (s=0). If in the low-speed category, the amount of time lag is 1 (s=1). If in the high-speed category, the amount of time lag is 2 (s=2). A second head tracking signal is detected at a timing corresponding to the amount of time lag, and control signals are generated based on this second head tracking signal.

Where s=0, the same control as that in FIG. 10A is performed without detecting a second head tracking signal. In other words, control signals are generated after a first head tracking signal is detected. The screen image generating means then generates screen image in a screen image generating interval $T_{50}$, and after a standby period of $T_6$ has elapsed, the screen image is displayed in synchronization with a screen image display trigger.

Where s=1, the control means detects a head tracking signal which is generated at the next point in time following the generation of a first head tracking signal. This is deemed the second head tracking signal. Control signals are generated based on this second head tracking signal, and are sent to the screen image generating means. Even if the amount of time lag varies, the time interval between the detection of a first head tracking signal and the display of the screen image does not change. Therefore, the screen image generating interval is reduced through the screen image generating interval reduction control process that corresponds to the amount of time lag. Where s=1, the screen image generating interval becomes $T_{51}$.

Where s=2, the control means detects a head tracking signal which is generated at the second next point in time following the generation of a first head tracking signal. Control signals are generated based on this second head tracking signal, and are sent to the screen image generating means. The screen image generating means generates screen image data in a screen image generating interval $T_{52}$ and sends it to the display means. After a standby period of $T_6$ has elapsed, image display takes place in synchronization with a screen image display trigger.

The specific example of FIG. 10B will be explained. The first control means detects a head tracking signal $B_1$ generated at a base time $t_1$. The angular speed of the rotational movement of the head at this point in time is classified based on this signal. H is given that it is classified here in the stationary category. Since s=0 in the case of the stationary category, the first screen image generating means normally performs processing within a screen image generating interval $T_{50}$ and generates screen image data. After a standby period $T_6$ has elapsed, screen image display takes place at a time $t_{34}$, in synchronization with a screen image display trigger.

The second control means detects a head tracking signal $B_2$ generated at a base time $t_2$. The angular speed of the rotational movement of the head at this point in time is classified based on this signal. It is given that it is classified in the low-speed category here. Since s=1 in the case of the low-speed category, a head tracking signal $B_3$ generated at the next base time $t_3$ is detected as a second head tracking signal. Control signals are generated based on this head tracking signal $B_3$ and are sent to the screen image generating means. The screen image generating means performs processing, within a screen image generating interval $T_{51}$, and generates screen image data. After a standby period $T_6$ has elapsed, screen image display takes place at a time $t_{45}$ in synchronization with a screen image display trigger.

The third control means detects a head tracking signal $B_3$ generated at a base time $t_3$. It is assumed in this case that the angular speed is classified in the high-speed category. Since s=2, a head tracking signal $B_5$ generated at the second next base time $t_5$ is detected again as a second head tracking signal. Control signals are generated based on this signal and are sent to the screen image generating means. The screen image generating means performs processing within a screen image generating interval $T_{52}$ and generates screen image data. After a standby period $T_6$ has elapsed, screen image display takes place at a timing $t_{56}$ in synchronization with a screen image display trigger.

The above processing, performed by the four processing means (each comprising a control means and a screen image generating means), is repeated. Using this control method, the discrepancy between the displayed screen image and the head position is reduced, as in the example shown in FIG. 9B. The device of the first embodiment uses the control process explained with reference to FIG. 9B. In the two examples given above, four processing means are not always needed, because four CPUs may be present in a processing means such that control can be performed such that screen images are sequentially generated by these CPUs. In short, a different construction is acceptable so long as the work station comprising the processing means is capable of performing multiple tasks.

By using the present invention, a natural display of screen images, which do not reflect a time lag due to head tracking, may be provided to the observer through the reduction of the screen image generating interval. Consequently, the observer can observe the screen images without feeling nausea or discomfort. The reduction of the screen image generating interval is achieved through a reduction in the number of colors or in the amount of image data, which makes high-speed processing and data transmission possible.

As described above, the processing time can be reduced by virtue of a simple control process to adjust the control of each means, and therefore the devices of the present invention may be constructed inexpensively without the need to add complex circuitry. In addition, when the head moves only slightly, a reduction in the number of colors does not take place, and therefore natural screen images may be observed.

Industrial Applicability

By using the invention, the amount of the captured image data may be reduced before transmission by the processing means of the image capture device. Consequently, the transmission interval may be extremely accelerated and screen images reflecting no time lag (display discrepancy) may be provided to the observer, based on the image data captured on a real-time basis.

Although the present invention has been described with reference to a presently preferred embodiment, it will be appreciated by those skilled in the art that various modifications, alternatives, variations, etc., may be made without departing from the spirit and scope of the invention as defined in the appended claims.

What is claimed is:

1. A screen image observing device comprising:
   a head tracking unit for detecting movement of a head of an observer;
   a screen image generator for generating screen image data based upon a result of said detection of said head tracking unit;
   a display for displaying said screen image data from said screen image generator; and
   a controller for controlling a screen image generating interval, used by said screen image generator, to adjust the screen image generating interval in response to a detection of a movement of a head by said head tracking unit.

2. A screen image observing device, as claimed in claim 1, further comprising an image capture unit, wherein said screen image generator generates said screen image data using captured image data from said image capture unit.

3. A screen image observing device, as claimed in claim 2, further comprising an image capture device, which comprises said image capture unit and a processing unit, wherein said controller controls said processing unit in response to the result of said detection performed by said head tracking unit, and wherein said processing unit transmits said captured image data to said screen image generator after controlling an amount of said captured image data, based upon signals received from said controller.

4. A screen image observing device, as claimed in claim 1, wherein said controller controls said screen image generating interval by controlling a number of colors per pixel in said screen image data.

5. A screen image observing device, as claimed in claim 1, wherein said controller controls said screen image generating interval by controlling a number of pixels for one item of screen image data.

6. A screen image observing method, comprising the steps of:
   detecting movement of a head of an observer;
   generating screen image data during a screen image generating interval;
   displaying said screen image data generated by said generating step; and
   controlling said screen image generating interval in response to the result of said detecting step.

7. A screen image observing method, as claimed in claim 6, further comprising the step of capturing an image, wherein said generating step uses data resulting from said capture step.

8. A screen image observing method, as claimed in claim 7, wherein said controlling step controls an amount of said screen image data to be displayed to control said screen image generating interval.

9. A screen image observing method, as claimed in claim 6, wherein said controlling step controls a number of colors per pixel in said screen image data.

10. A screen image observing method, as claimed in claim 6, wherein said controlling step controls a number of pixels for one item of screen image data.

11. A screen image observing device comprising:
    a head tracking unit for detecting movement of a head of an observer;
    a screen image generator for generating screen image data;
    a display for displaying said screen image data based on said screen image data generated by said screen image generator; and
    a controller for controlling a time period, which is required for said screen image generator to generate screen image data, in response to a result of said detection of said head tracking unit.

12. A screen image observing device, as claimed in claim 11, wherein said controller for making said screen image generator changes an amount of said screen image data to control said time period.

13. A screen image observing device, as claimed in claim 12, wherein said screen image data has a plurality of pixels, each of which is represented by a plurality of bits, and said controller makes said screen image generator reduce a number of said bits.

14. A screen image observing device, as claimed in claim 12, wherein said screen image data has a plurality of pixels, and said controller makes said screen image generator reduce a number of said pixels.

15. A screen image observing device comprising:
    a head tracking unit for detecting movement of a head of an observer;
    a screen image generator for generating screen image data based upon a result of said detection of said head tracking unit;
    a display for displaying said screen image data from said screen image generator; and
    a controller for controlling a screen image generating interval, used by said screen image generator, to adjust the screen image generating interval in response to a detection of a movement of a head by said head tracking unit,
    wherein said controller reduces said screen image generating interval when a following formula is satisfied:

$$V\theta \geq \frac{2Y}{X}$$

wherein:
   $V\theta$=an angular speed, in degrees per second, of rotational movement of the head of the observer, calculated from the result of said detection performed by said bead tracking unit;
   Y=a frame rate in frames per second; and
   X=number of pixels in the image, displayed by the display, in a one-degree angle of view on a retina.

16. A screen image observing method, comprising the steps of:
    detecting movement of a head of an observer;
    generating screen image data during a screen image generating interval,
    displaying said screen image data generated by said generating step; and
    controlling said screen image generating interval in response to the result of said detecting step,
    wherein said step of controlling a screen image generating interval reduces said screen image generating interval when a following formula is satisfied:

$$V\theta \geq \frac{2Y}{X}$$

wherein:
   $V\theta$=an angular speed, in degrees per second, of rotational movement of the head of the observer, calculated from the result of said detection performed by said detecting step;
   Y=a frame rate in frames per second; and
   X=number of pixels in the image, displayed in the display step, in a one-degree angle of view on a retina.

* * * * *